Nov. 9, 1954   R. H. COWLES   2,693,848
SPRING-CUSHIONED CHAIR SEAT
Filed July 24, 1952   2 Sheets-Sheet 1
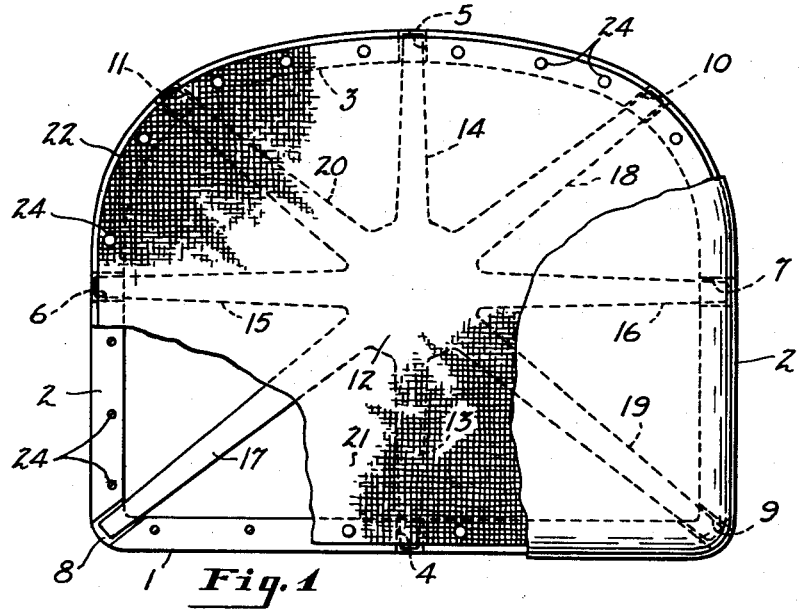
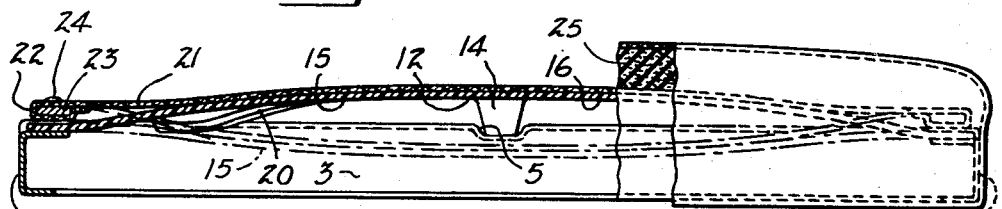
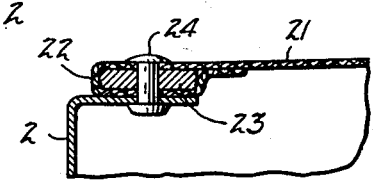
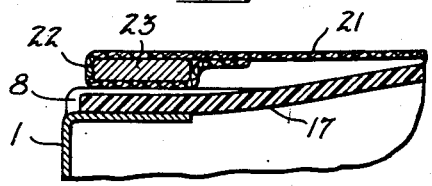
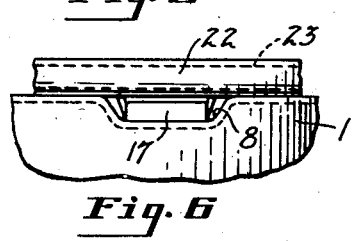
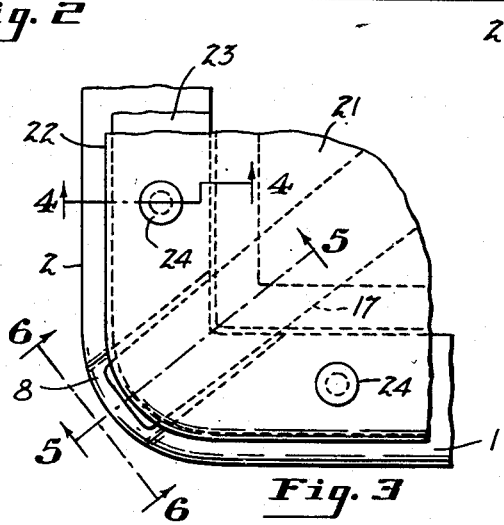
INVENTOR
Raymond H. Cowles
BY Evans + McCoy
ATTORNEYS Nov. 9, 1954

R. H. COWLES 2,693,848

SPRING-CUSHIONED CHAIR SEAT

Filed July 24, 1952

INVENTOR
*Raymond H. Cowles*

BY *Evans & McCoy*
ATTORNEYS

United States Patent Office 2,693,848
Patented Nov. 9, 1954

2,693,848

SPRING-CUSHIONED CHAIR SEAT

Raymond H. Cowles, Wabash, Ind., assignor to The General Tire and Rubber Company, Akron, Ohio, a corporation of Ohio Application July 24, 1952, Serial No. 300,731

4 Claims. (Cl. 155—179)

This invention relates to chair seats and more particularly to a spring supported cushion seat that covers the opening in the seat frame.

The seat of the present invention comprises an upwardly arched spring that bridges a seat opening and that is slidably supported on opposite sides of the opening so that the spring ends can slide outwardly away from and toward the opening as the spring is flexed. To limit the downward flexure of the spring and to prevent imposition of an excessive downward thrust on the spring, a flexible supporting member is provided that is attached to the seat frame and to the spring and that serves to keep the spring centered with respect to the seat opening and also to limit the downward flexure of the spring. The flexible supporting member is preferably in the form of a web of flexible sheet material that extends across the seat opening and that is attached to the seat frame on opposite sides of the opening, the web being attached to the spring intermediate its ends to retain the spring in centered position with respect to the opening and also to limit the downward flexure of the spring.

The supporting web is preferably a piece of woven fabric such as heavy canvas that is of a size to cover the seat bottom and that is secured to the seat frame around the opening. The upwardly arched spring bears against the under side of the canvas web and is secured thereto so that it is held against bodily lateral movements. The spring is preferably formed of fiber glass and may be adhered to the fabric web by means of a suitable plastic binder applied to the spring and fabric in a suitably heated mold.

In order to provide a spring that has uniform flexure, a one-piece fiber glass body is provided that has a central body portion from which a series of integral arms radiate, the free ends of the arms slidably engaging the frame at spaced points around the seat opening so that they are uniformly flexed downwardly by the weight of a person seated in the chair.

The invention has for its object to provide a cushion seat of light weight and inexpensive construction which gives a feeling of depth when a person sits in the chair and which will always return the seat to its original crowned contour when relieved of weight.

A further object is to provide a chair seat which requires only a relatively thin padding to provide comfort.

A further object of the invention is to provide a seat that is held in its crowned position by means of an arched spring which can be flexed to concave form and which is so supported that the load imposed upon the spring is limited to a substantially predetermined maximum and in which the flexure of the spring is limited to a predetermined amount.

Reference should be had to the accompanying drawings forming a part of this specification in which:

Figure 1 is a top plan view of a seat embodying the invention, portions of the pad and webbing being broken away to show the underlying structure;

Fig. 2 is a view on an enlarged scale partly in front elevation and partly in transverse vertical section;

Fig. 3 is a fragmentary plan view on a scale still more enlarged of a corner portion of the seat;

Fig. 4 is a fragmentary section taken on the line indicated at 4—4 in Fig. 3;

Fig. 5 is a fragmentary section taken on the line indicated at 5—5 in Fig. 3;

Fig. 6 is a fragmentary elevation of a seat corner viewed as indicated at 6—6 in Fig. 3;

Figure 7:
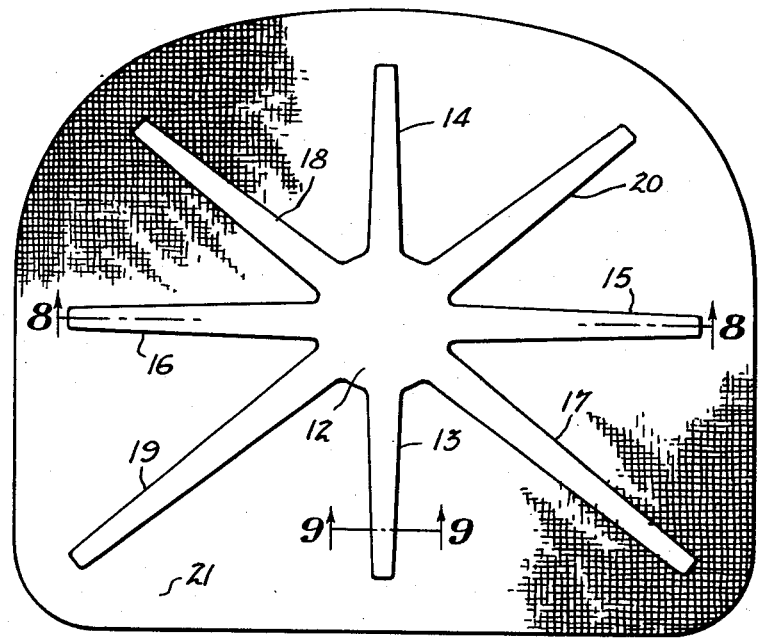
Fig. 7 is a bottom plan view of the seat supporting unit.
Figure 8:
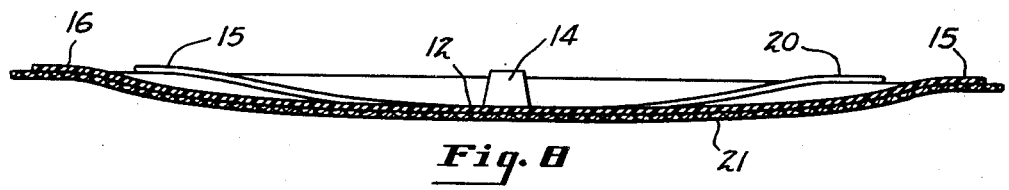
Fig. 8 is a transverse section taken on the line indicated at 8—8 in Fig. 7.
Figure 9:
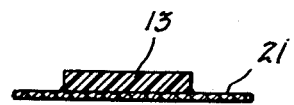
Fig. 9 is a fragmentary section taken on the line indicated at 9—9 in Fig. 7.

In the accompanying drawings the invention is shown applied to a seat frame having a front member 1, side members 2 and a curved rear member 3, the frame defining a seat opening. The seat frame corresponds in shape to a conventional chair seat, the frame members serving as a marginal support for a cushioned seat. The front frame member 1 has a groove 4 transversely across its top substantially midway between its ends and the rear frame member 3 has a groove 5 that is substantially midway between its ends that is alined with the groove 4. The side members 2 have grooves 6 and 7 across their top faces substantially midway between the front and back of the chair seat. The front corners of the frame have diagonally disposed grooves 8 and 9 in their top faces and the rear frame member 3 has grooves 10 and 11 which aline with the grooves 8 and 9.

The cushion seat has a one-piece supporting spring that is formed with a central body portion 12 from which a series of arms 13, 14, 15, 16, 17, 18, 19 and 20 radiate. The integral arm 13 extends forwardly and has its forward end slidably mounted in the groove 4. The arm 14 extends rearwardly and has its rear end slidably mounted in the groove 5. The arms 15 and 16 extend in opposite directions from the body 12 at substantially right angles to the arms 13 and 14 and have their outer ends slidably supported in the grooves 6 and 7. The arms 17 and 18 extend diagonally from the central body portion 12 to the grooves 8 and 10 and similar diagonal arms 19 and 20 extend from the central body portion 12 to the grooves 9 and 11.

When weight is imposed upon the central body portion 12 of the spring, the radiating arms are all flexed downwardly and the ends of the arms slide outwardly in the frame grooves. If the spring is flexed beyond the horizontal plane of the seat frame the movement of the arms on the frame members is reversed and the ends of the arms slide inwardly on the frame members toward the seat opening.

To keep the spring centered with respect to the seat opening and to prevent excessive flexure thereof, a flexible supporting member is provided which is in the form of a flexible web 21 of substantially inextensible material that extends across the seat opening and that is attached to the frame on opposite sides of the opening and also to the spring. This flexible web ties the spring to the frame so as to prevent lateral bodily movement of the spring on the frame and also serves to limit the downward flexure of the spring. The web 21 is preferably a piece of woven fabric such as a heavy canvas that is of a shape that corresponds substantially to the seat frame and that is attached by suitable means to the seat frame around the seat opening. As herein shown, the supporting web 21 has a marginal portion 22 looped over a flat reinforcing frame 23 that conforms to the seat frame and is secured to the frame members by means of a series of rivets 24 that pass through the frame 23. The central body portion and radiating arms define a smoothly curved upper surface of the fiber glass spring which engages and is adhered to the smoothly curved lower surface of the flexible web 21.

The spring receiving grooves in the frame are of a depth at least equal to the thickness of the spring arms so that the spring arms can slide freely beneath and adjacent the canvas web toward and away from the seat opening defined by the frame members 1, 2 and 3. The canvas web 21 is stretched tightly over the supporting spring and serves as a base for a suitable sponge rubber cover 25 or other suitable padding. The supporting spring can flex downwardly under the weight of a person seated in the chair until its curvature is substantially reversed, whereupon the entire weight in excess of that required to flex the spring is imposed upon the canvas web. The canvas web thus serves to protect the spring against excessive distortion and the spring serves to support normal loads independently of the web, a load being applied to the web only when the load applied to the spring is in excess of a predetermined amount.

Because of the ready transformation of the seat from a convex to a concave contour and due to the uniform flexing of the spring, a very comfortable seat is provided even though the padding be relatively thin.

It is to be understood that in accordance with the provisions of the patent statutes, variations and modifications of the specific devices herein shown and described may be made without departing from the spirit of the invention.

What I claim is:

1. The combination with a seat frame having front, back and side members defining a seat opening, of a cushion seat bottom comprising an upwardly arched one-piece supporting spring having a central body portion and integral arms that radiate from said body portion and that are slidably supported at their ends for radial movements upon said front, back and side members, a second supporting member in the form of a flexible web of substantially inextensible material extending across said opening and attached to said frame members, said web being attached to the central body portion of said spring to hold the spring in centered position with respect to said opening and to limit downward flexure of said spring, said body portion and integral arms having smoothly curved upper surfaces parallel to and engaging the lower surface of said web, and means for spacing portions of said web overlying the end portions of said arms from said frame members to permit said end portions of said arms to slide on said frame members upon deflection of said seat bottom.

2. The combination with a seat frame having front, side and back members defining a seat opening, of a cushion seat bottom having a supporting member in the form of a web of flexible sheet material extending across said seat opening and attached to said frame members, an upwardly arched supporting spring engaging the under side of said web, said spring having a central body portion attached to said web to center said body portion with respect to said seat opening, arms radiating from said body portion, the several free ends of said arms being slidably supported on said front, back and side members for movements toward and away from said seat opening, said central body portion and said radiating arms having the major portion of their upwardly facing surfaces smoothly curved and engaging said under side, and means for spacing portions of said web overlying said frame members and end portions of said arms from the portions of said arms engaging said frame members to permit said end portions of said arms to slide on said frame members upon deflection of said seat bottom.

3. The combination with a seat frame defining a seat opening and having grooves extending transversely across the top thereof at spaced points around said opening, of an upwardly arched one-piece spring having a central body portion with a smooth convex top face and integral radiating arms whose outer ends are slidably supported and guided for radial movement in said grooves and which have smooth top faces that are continuations of the face of said body portion, the end portions of said arms being of a thickness less than the depth of said grooves, and a flexible fabric supporting web overlying said spring and attached at its margin to said frame, said web being adhered to the top face of said central body portion to hold said spring in centered position and being spaced above the end portions of said arms.

4. The combination with a seat frame having front, side and back members defining a seat opening of generally rectangular form, of a cushion seat bottom having a supporting member in the form of a piece of woven fabric of generally rectangular form covering said opening and attached at its margin to said frame members and an upwardly arched backing spring having a smooth curved top surface secured to and engaging the smoothly curved under side of said supporting member, said spring having a body portion attached to said supporting member centrally thereof and arms radiating therefrom and slidably supported on said frame members for radial sliding movements toward and away from said seat opening, said spring having longitudinally extending arms slidably engaging the frame side members, transversely extending arms having end portions engaging said front and back members and diagonally extending arms with end portions engaging said frame adjacent the corners thereof, and spacing means to space end portions of said arms from said supporting member.

References Cited in the file of this patent

UNITED STATES PATENTS

| Number | Name | Date |
|---|---|---|
| 118,782 | Blakeney | Sept. 12, 1871 |
| 175,161 | Pruyne | Mar. 21, 1876 |
| 1,833,817 | Bing | Nov. 24, 1931 |
| 1,904,841 | Watts | Apr. 18, 1933 |
| 2,316,628 | Schaffner | Apr. 13, 1943 |